United States Patent
Thomas et al.

(10) Patent No.: US 8,740,515 B2
(45) Date of Patent: Jun. 3, 2014

(54) METAL CUTTING DRILL BIT

(75) Inventors: Rickey J. Thomas, Lineboro, MD (US); Florian Probst, Hutthurm (DE); Thomas J. Quinn, Towson, MD (US); Abhijeet P. Joshi, Baltimore, MD (US); Alfons K. Wetzl, Salzweg (DE); Albert Leidl, Passau (DE); David N. Johnson, Crook (GB)

(73) Assignee: Black & Decker Inc., Newark, DE (US)

( * ) Notice: Subject to any disclaimer, the term of this patent is extended or adjusted under 35 U.S.C. 154(b) by 1177 days.

(21) Appl. No.: 12/539,831

(22) Filed: Aug. 12, 2009

(65) Prior Publication Data

US 2010/0054881 A1   Mar. 4, 2010

Related U.S. Application Data

(60) Provisional application No. 61/093,827, filed on Sep. 3, 2008.

(51) Int. Cl.
 *B23B 51/02* (2006.01)

(52) U.S. Cl.
 USPC ............ 408/144; 408/230; 408/227; 408/229

(58) Field of Classification Search
 USPC .................................. 408/144, 230, 227, 229
 See application file for complete search history.

(56) References Cited

U.S. PATENT DOCUMENTS

| | | |
|---|---|---|
| 2,769,355 A | 11/1956 | Crisp |
| 3,387,511 A | 6/1968 | Ackart, Sr. et al. |
| 4,756,650 A | 7/1988 | Wakihira et al. |
| 4,826,368 A | 5/1989 | Tikal et al. |
| 4,898,503 A | 2/1990 | Barish |
| 4,983,079 A | 1/1991 | Imanaga et al. |
| 5,088,863 A | 2/1992 | Imanaga et al. |
| 5,230,593 A | 7/1993 | Imanaga et al. |
| 5,350,261 A | 9/1994 | Takaya et al. |
| 6,050,754 A | 4/2000 | Thomas |
| 6,113,321 A | 9/2000 | Mulroy et al. |
| 6,190,097 B1 * | 2/2001 | Thomas ........................ 408/230 |
| 6,309,149 B1 | 10/2001 | Borschert et al. |
| 6,637,987 B2 * | 10/2003 | Lui et al. ......................... 408/26 |
| 7,241,085 B2 | 7/2007 | Frisendahl |
| 7,267,514 B2 | 9/2007 | Wetzl et al. |

(Continued)

FOREIGN PATENT DOCUMENTS

| | | |
|---|---|---|
| CH | 675842 | 11/1990 |
| DE | 216 607 | 11/1908 |

(Continued)

*Primary Examiner* — Sarang Afzali
(74) *Attorney, Agent, or Firm* — Scott B. Markow

(57) ABSTRACT

A combination drill bit for use in both hand held drills and stationary drill presses has a shanking end, a working end and a helical flute portion between the shanking and working ends. The helical portion has a helix length (L) of $$L = \left(\frac{D \times \pi}{\tan \alpha}\right).$$

The drill bit has a core that is tapered from the working end to the shanking end. A web thickness length at the working end is 10% to 35% of the diameter and the thickness length at the junction of the shanking end is 70% to 90% of the diameter. The drill bit is manufactured from a high speed steel including at least 5% by weight of cobalt.

11 Claims, 3 Drawing Sheets

(56) References Cited

U.S. PATENT DOCUMENTS

| | | | |
|---|---|---|---|
| 7,851,067 | B2 * | 12/2010 | Caliskanoglu et al. ........ 428/469 |
| 8,168,009 | B2 * | 5/2012 | Mesquita et al. ............. 148/328 |
| 2002/0160235 | A1 * | 10/2002 | Caminiti ....................... 428/698 |
| 2006/0056930 | A1 * | 3/2006 | Rompel ......................... 408/225 |

FOREIGN PATENT DOCUMENTS

| | | |
|---|---|---|
| DE | 1 017 438 | 10/1957 |
| DE | 1 602 874 | 11/1970 |
| DE | 73 35 696 | 10/1973 |
| DE | 39 27 615 | 2/1991 |
| DE | 41 17 486 | 12/1992 |
| DE | 198 07 609 | 6/1999 |
| DE | 200 05 730 | 11/2000 |
| DE | 202 09 767 | 11/2003 |
| DE | 202 11 589 | 1/2004 |
| DE | 10 2006 049 096 | 4/2008 |
| EP | 0 249 104 | 12/1987 |
| EP | 0 901 489 | 4/2000 |
| EP | 0 893 185 | 8/2003 |
| EP | 0 320 881 | 10/2003 |
| EP | 0 761 352 | 10/2003 |
| EP | 2 058 073 | 5/2009 |
| GB | 699 716 | 11/1953 |
| GB | 1 144 035 | 5/1969 |

* cited by examiner

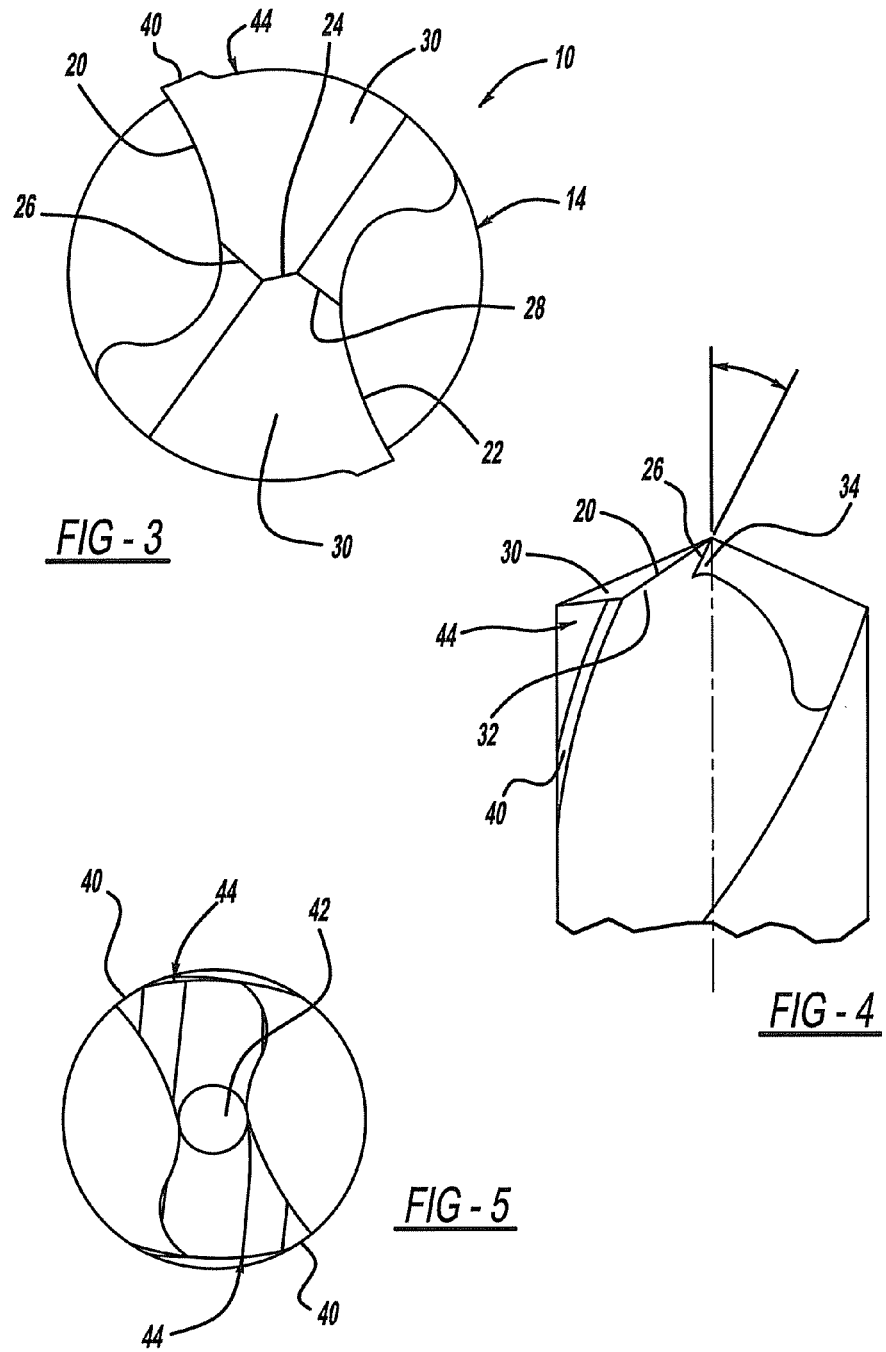

METAL CUTTING DRILL BIT

CROSS-REFERENCE TO RELATED APPLICATION

This application claims the benefit of U.S. Provisional Application No. 61/093,827, filed Sep. 3, 2008. The disclosure of the above application is incorporated herein by reference.

FIELD

The present disclosure relates to metal cutting drill bits and, more particularly, to a metal cutting drill bit that can be used in both hand held drills as well as stationary drill presses.

BACKGROUND

Ordinarily, two different types of drill bits are utilized in hand held drills and in stationary drill presses. In a hand held drill, the user is primarily interested in the cutting speed. Accordingly, the drill bit is designed to cut rapidly through the workpiece. In order to do this, the drill bit has very aggressive cutting angles. Thus, the relief angles, helical angles and cutting angles are designed to rapidly cut through a workpiece. Also, hand held drill users generally apply relatively constant, small forces to the drill during operation. High speed steel generally can be utilized as the material for the drill bit.

In a stationary drill press, life of the drill bit generally is most important to the user. Speed is generally a secondary consideration. In stationary drill presses, a variable force that is larger than that used in a hand-held drill is applied to the drill bit. Thus, as the drill bit dulls, an increased force is applied to maintain the same feed rate. Stationary drill presses are concerned with drilling a large number of holes in a reasonable time. Thus, a drill bit for a stationary drill press has less aggressive cutting angles and a larger chisel edge. This provides for additional stability during use of the drill bit. Also, the drill bits are designed to dissipate and minimize heat that occurs at the working tip during use.

A drill bit designed for a hand held drill is not stable enough, when utilized in a stationary drill press, so that failure occurs after a small number of holes are formed in a workpiece. Additionally, the drill bit is incapable of dissipating large amounts of heat that occurs at the working tip when it is utilized in a stationary drill press. Accordingly, hand held drill bits fail relatively quickly in a stationary drill press.

Drill bits designed for stationary drill presses do not cut fast enough to be used in a hand held drill. Also, due to their ability to dissipate heat, the material used for their manufacturing is brittle. Accordingly, lateral loads applied to these drill bits cause failure. Thus, since the design factors for drill bits used in stationary drill presses is diametrically opposite to drill bits used in hand held drills, the technologies have not been combined to provide a drill bit that functions satisfactorily in both hand held drilling applications as well as in stationary drill press applications.

SUMMARY

Accordingly, it is an object of the present disclosure to provide a drill bit that is utilized in both hand held drills as well as stationary drill presses. The present device provides a drill bit that performs well in both hand held and stationary drilling. Additionally, the drill bit provides cutting of a satisfactory number of holes using it in a hand held drill within a specified amount of time. Additionally, the same drill bit drills a large number of holes when utilized in a stationary drill press.

It is an object of the present disclosure to provide a drill bit that comprises a shanking end, a working end, and a helical flute portion between the shanking end and the working end. The helical flute portion has a web that tapers from the working end to the shanking end. The web thickness is at a ratio (K:J), of the working end (K) to the junction (J) at the shanking end, of about 1:2 to 1:5. The helical flute portion has a helix length (L) of $$L = \left(\frac{D \times \pi}{\tan\alpha}\right),$$

D is the bit diameter and $\alpha$ is the helix angle. Additionally, the drill bit is manufactured from a high speed steel material having at least 5% by weight of cobalt. The drill bit may be vapor vacuum coated including a layer of aluminum carbide, titanium aluminum nitride or combinations thereof. The working point may be a split point with a chisel edge having a length from about 0.11 to 0.32 mm. The drill bit is hardened at a temperature between 1160° to 190° C.

According to a second object, a combination drill bit for a hand held drill and a stationary drill press comprises a shanking end, a working end, and a helical flute portion between said shanking end and said working end. The helical flute portion has a web that tapers from the working end to the shanking end. The web taper rate (which is the difference between the web thickness at the working end (K) and the web thickness at the junction of the tapered web and the shanking end (J), divided by the length of the tapered section (L) is at least approximately 0.080. The helical flute portion has a helix length of about $$L = \left(\frac{D \times \pi}{\tan\alpha}\right).$$

Additionally, the drill bit is manufactured from a high speed steel material having at least 5% by weight of cobalt. Additionally, a coating layer may be applied to the drill bit. The drill bit drilling at least approximately 15 holes during a constant bias life test or at least approximately 2,300 holes during a constant feed life test.

According to a third aspect of the disclosure, a method of drilling a workpiece using a hand held drill or a stationary drill press using the same drill bit in both comprises chucking the drill bit in the hand held drill, drilling at least approximately 15 holes using the hand held drill or, chucking the drill bit in the stationary drill press, and drilling at least approximately 2,300 holes in a workpiece using the stationary drill press. The hand held drill drills each hole in a time period of less than approximately 90 seconds. The drilling of the at least approximately 2,300 holes in the drill press occurs without failure of the bit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a plan view of the working tip of the drill bit of FIG. 1.

FIG. 4 is a perspective view of the working tip of the drill bit of FIG. 1.

FIG. 5 is a cross-section view of the drill bit of FIG. 1 along line 5-5 thereof.

DETAILED DESCRIPTION

Figure 1:
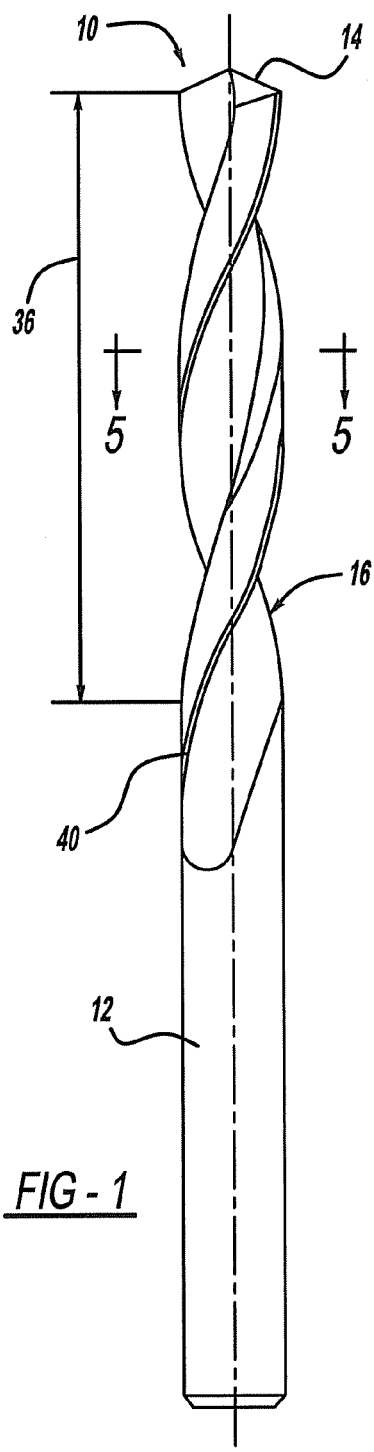
FIG. 1 is a plan view of a drill bit.

Example embodiments will now be described more fully with reference to the accompanying drawings.

Important drilling factors are speed, constant bias life and constant feed life of the drill bit. It has been found that speed is influenced by the thickness of the web at the working end. Also, it has been found that speed is also influenced by the helix length of the drill bit. It has been found that constant bias life is influenced by the web thickness at the working end of the drill bit. Additionally, the constant feed life is increased by the tapered thickness at the junction of the shank. Accordingly, during testing of the drill bits, it was found that utilizing parameters that are contrary to use in a hand held or stationary drill press provided excellent results for the present drill bit. Accordingly, the disclosed drill bit provides a single drill bit that may be utilized in both a hand held drill and a stationary drill press. The drill bits provide excellent results in both applications eliminating the need for separate drill bits to be utilized in both applications.

Referring to the figures, a drill bit is illustrated and designated with the reference numeral 10. The drill bit 10 includes a shanking end 12, a working end 14 and a helical flute portion 16 positioned between the shanking end and the working end. The shanking end 12 has a desired diameter so that it may be positioned into a chuck of a hand held drill as well as a chuck of a stationary drill press.

The working end 14 may have a split point design including primary cutting edges 20 and 22, chisel edge 24 and secondary cutting edges 26, 28 as best seen in FIG. 3. The primary cutting edges 20 and 22 are defined by a clearance face 30 and a rake face 32. The clearance face 30 is on an angle of about 10° to 14° and the rake face 32 is at an angle of about 34° to 36°. The rake face 32 and clearance face 30 define the primary cutting edges 20, 22.

The secondary cutting edges 26 and 28 are defined by a clearance face 30 which is the same for the primary cutting edge. A rake face 34 is formed during a wheel grind of the working end 14 to form the split point (see FIG. 4). The clearance face 30 is on an angle of about 10° to 14° and the rake face 34 is at an angle of about 3° to 5°. The rake face 34 and clearance face 30 define the secondary cutting edges 26, 28.

The chisel edge 24 has a length of about 0.11 to 0.32 mm, e.g., approximately 0.25 to 0.35 mm. The chisel edge 24 is between the primary 20, 22 and secondary 26, 28 cutting edges. The chisel edge 24 length increases the strength of the drill bit during drill press cutting.

The helical flute portion 16 extends from the working end 14 to the shanking end 12. The helical flute portion 16 has a helix length (L) 36 defined by the equation $$L = \left(\frac{D \times \pi}{\tan \alpha}\right),$$

D is the bit diameter and α is the helix angle. A ratio of the diameter to the helix length 36 of the drill bit 10 is from about 1:4 to 1:5. e.g., between 1:4.5 to 1:4.75. In one embodiment, the ratio is 1:4.66. The helical flute portion 16 has a parabolic flute as best seen in FIG. 5. The helix angle α is about 34° to 36°. Additionally, the helical flute portion 16 includes a pair of margins 40. The margins 40 have a width length of about 8% to 12% of the diameter. The lands 44 including the margins 40 define the outer diameter of the drill bit 10. The helix length improves the speed of cutting of the drill bit.

Figure 2:
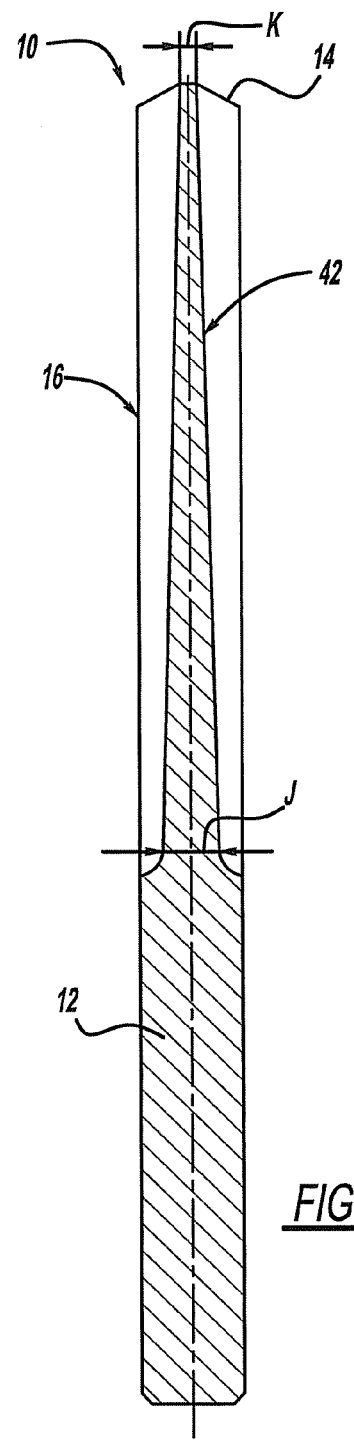
FIG. 2 is a longitudinal cross section view of the drill bit of FIG. 1.

The drill bit 10 includes a tapered core 42 that extends from and increases in thickness from the working end 14 to the chucking end 12 as see in FIG. 2. The tapered core 42 has a thickness (K) at the working end of between 10% to 35% of the diameter, e.g., between 15% to 25%. In one embodiment, the thickness (K) at the working end is 19% of the diameter. The thickness (J) at the chucking end is between 70% to 90% of the diameter, e.g., between 80% to 90%. In one embodiment, the thickness (J) is 87% of the diameter. Thus, a ratio (K:J) of the thickness of the taper at the tip to the junction at the shanking portion is between 1:2 to 1:5 mm, e.g., 1:4 to 1:5. In one embodiment, the ratio (K:J) is 1:4.58. The web tapers at a rate defined by the difference between the web thickness at the shanking end (J) and the web thickness at the working end (K), divided by the length of the tapered section (L). In one embodiment, the web taper rate is at least 0.080. The taper thickness at the working edge enhances the speed and constant force cutting of the drill bit. The taper thickness at the rear of the drill bit enhances cutting and the robustness of the drill bit to enhance its strength during repetitive cutting on a stationary drill press. It is believed that the dramatically large web taper rate is one important factor in the success of this present drill bits.

The drill bit is ordinarily made from high speed steel. The high speed steel includes cobalt in the presence of about 5% to 8% by weight. This increases the drill bit's resistance to heat during cutting in a stationary drill press. Additionally, the drill bit may be manufactured from materials such as M42 steel and WKE42 steel.

The drill bit may include a coating layer that is vapor deposited onto the drill bit. The coating has a desired thickness of about 2 to 5 microns. The coating may be selected from a group comprising aluminum chromate, titanium aluminum nitride or combinations thereof. The coating provides a resistance to heat as well as "slip" or an increase in the cutting speed of the drill bit under high forces like those applied during cutting on a stationary drill press.

The present drill bits are formed with the helix and placed into a loading bin. The drill bits are heated with hot air at a temperature between 70° C.-90° C. for about 10 minutes. The drill bits are transferred into a salt bath in a first oven heated to a temperature between 830° C.-870° C. for about 2 minutes. The drill bits are transferred into a salt bath in a second oven heated to a temperature between 1030° C.-1070° C. for about 2 minutes. The drill bits are transferred into a salt bath in a third oven heated to a temperature between 1160° C. and 1190° C. for about 80-120 seconds. The drill bits are transferred onto a salt bath quench in a fourth oven heated to a temperature between 530° C.-570° C. for about 2 minutes. The drill bits are transferred into a salt bath quench in a fifth oven heated to a temperature between 530° C.-570° C. for about 2 minutes. The drill bits are unloaded from the oven and cleaned and tempered. Tempering is accomplished by heating the drill bits up a temperature between 530° C.-590° C. and holding the drill bits at this temperature for about 1.5 hours. The drill bits are cooled to about 40° C. The tempering step is conducted two more times. This hardens the tempered drill bits to have a hardness of between 66 to 69 HRC.

Figure 6:
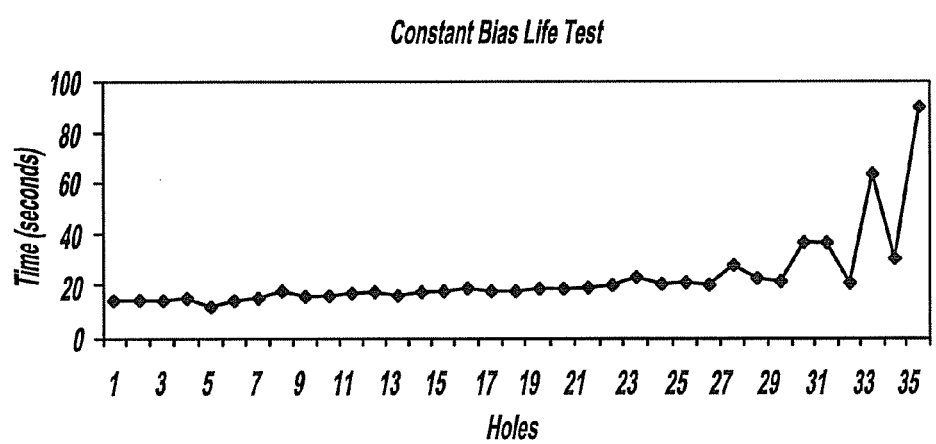
FIG. 6 is a graph of results of the constant bias life test.

Experiments show that the drill bit is suitable for use in a hand-held drill. When a user drills a hole in a workpiece using a hand-held drill, it has been found that the user generally applies a low constant force onto the drill in order to drill a hole. As the drill bit becomes dull, the user will determine that the drill bit is worn out after it does not cut a hole in a reasonable amount of time. Accordingly, the present drill bit 10, during hand held drilling, provides for the drilling of at least approximately 15 holes, each drilled in less than approximately 90 seconds when drilling metal such as 304 stainless steel. The drilling of holes using a hand-held drill was simulated in a constant bias, or force test, by using an Orwin test rig. Orwin test rigs can be obtained at Orwin, Newcastle, UK. The Orwin test rig is utilized to life test drill bits where a constant bias is applied to the drill. A DeWalt® DW165 corded drill rotating at 1200 rpm with no load was utilized in the rig. Generally, the test material or workpiece was a 6 mm thick, 304 stainless steel. The low constant bias or force is applied onto the drill with a ¼" diameter drill bit of the present disclosure. The low constant bias force is set at approximately 31 kg (68 lbs). Acceptable hole drill times are under approximately 90 seconds. Above approximately 90 seconds, at a constant bias, the user believes the drill bit is worn out. Accordingly, the cutoff time for drilling the holes is 90 seconds or a total of 500 holes, whichever comes first. Thus, if the drill bit fails to drill the hole within a 90 second time range, it is considered to have failed the test. A graph of the test is illustrated in FIG. 6. As shown in FIG. 6, on average, exemplary drill bits of the present disclosure were able to drill between 30 to 50 holes with a drilling time for each hole ranging from approximately 17 seconds to approximately 90 seconds. In one example, the drill bits were able to drill at least 35 holes, with a drill time of less than 90 seconds for each hole, far exceeding the goal of at least 15 holes at 90 seconds per hole.

In addition, the testing on the Orwin test rig show that the exemplary drill bits of the present disclosure achieve a speed of approximately 18 seconds, where the speed of cut of the drill bits is determined by an average bore time of the first five holes drilled. For example, the drill bits of the present disclosure achieved a speed of cut of about 17 seconds, further showing the suitability of these drill bits for use in a hand-held drill.

Experiments also show that the drill bit is suitable for use in a stationary drill press. When a user drills holes in a workpiece with a stationary drill press, the user increases the force on the drill bit in order to maintain a constant cutting feed rate. As the force is varied and increased, if the drill bit does not keep up its constant feed rate due to the increase force, the drill bit will catastrophically fail. In order to simulate the life of the drill bit in a stationary drill press, a constant feed life test was performed using an Emco life rig. Emco rigs can be obtained at Emco Salzburg, Austria. The rig utilizes a spindle speed at 750 rpm and the test material is 4140 steel. Holes are bored into the 4140 steel at a drilling depth of about 18 mm. The feed rate of the drill bit into the material is set at 0.006 inch per revolution. Thus, as the drill bit becomes dull, an increased force is applied in order to maintain the constant feed rate. Accordingly, the force is varied since as the drill bit becomes more dull, an increased force is continued to be applied. The cutoff point for the drill bit is catastrophic failure. That is, when the drill bit breaks. During the constant feed life test using the Emco rig, the drill bits of the present disclosure provided for the drilling of at least approximately 2,300 holes without catastrophic failure. Several exemplary drill bits of the present disclosure drilled at least approximately 3,000 holes, with some of these drill bits drilling in excess of 3,600 holes. This far exceeds the minimum requirements for a drill bit to be used in a drill press.

Drill bits in accordance with the present disclosure were tested against existing drill bits that were identified as being the best on the market for hand held drill metal cutting and against existing drill bits that were identified as the best on the market for stationary drill press cutting (collectively the "Best of Class" drill bits). Applicant has found no drill bits that were designed for uses in both hand held drills and stationary drill presses.

Three Best of Class bits were tested. For hand held metal cutting, the bits used were quarter inch (¼") diameter DeWalt® black oxide drill bits. For drill press cutting, the bits used were quarter inch (¼") Dormer drill bits and quarter inch (¼") Kennedy/Cle-Line drill bits. These drill bits were tested for speed of cut in the constant biasing force test (to simulate hand held cutting) as well as for life in the constant cutting feed rate test (to simulate drill press cutting). Accordingly, all of these drill bits were tested in the Orwin test rig, as identified above, to determine speed of cut with constant bias or force. Additionally, the three drill bits were tested in the Emco life rig, as described above, to determine a constant feed life. The results of the DeWalt drill bits, Dormer drill bits and Kennedy/Cle-Line drill bits are illustrated below.

Quarter inch (¼") diameter DeWalt® black oxide drill bits (DW1163) were tested as described. This drill bit is designed for hand held drill metal cutting only. During the constant bias test (to simulate hand held drilling), the DeWalt® black oxide drill bits had an average speed of cut of about 17.8 seconds (which is the average speed for drilling the first five holes). Additionally, the DeWalt® black oxide drill bits drilled an average of 31 holes in less than 90 seconds per hole during the constant bias test. However, in the constant feed test (to simulate drill press drilling), the DeWalt® black oxide drill bits drilled only an average of 1,778 holes before failure.

Quarter inch (¼") Dormer drill bits (A577 6.40 mm HSCO PFX ALTIN COATED JOBBER DRILL) (Dormer is a brand of Sandvik Company) were tested as described above. The Dormer drill bit is a stationary drill press drill bit. During the constant bias test (to simulate hand held drilling), the Dormer drill bits were unable to cut even a single hole in 90 seconds or less, thus failing the test. During the constant feed life test (to simulate drill press drilling), the Dormer drill bits drilled an average of 2,311 holes before failure.

Quarter inch (¼") Kennedy/Cle-Line drill bits (6.40 mm XT33 WP CO SS JBR DRL BRZ HSCo8 T7) (Cle-Line is a product of Kennametal Company, Inc.) were tested as described above. The Kennedy/Cle-Line drill bit is a stationary drill press drill bit. During the constant bias test (to simulate hand held drilling), the Kennedy/Cle-Line drill bits had an average speed of cut of about 24.2 seconds, and drilled only an average of 15 holes at 90 seconds or less per hole. During the constant feed life test (to simulate drill press drilling), the Kennedy/Cle-Line drill bits drilled an average of 1,609 holes during the constant feed test.

The "Best of Class" drill bits provide a bench mark for a drill bit to be used in a hand held drill as well as a stationary drill press. Thus, it is desired that a drill bit have a speed of cut of less than 18 seconds per hole for the first five holes. Additionally, the drill bit should cut at least 15 holes during the constant biasing test. Additionally, the drill bits should drill at least 2,300 holes during a constant feed test.

Having benchmarks from the Best in Class drill bits, drill bits in accordance with the present disclosure were tested as described above.

Example #1

Quarter inch (¼") diameter experimental drill bits manufactured from M42 steel with a titanium aluminum nitride coating were tested. In the constant bias test (to simulate hand held drilling), the drill bits had an average speed of cut of 17.3 seconds per hole for the first five holes, and drilled an average of 49 holes at a rate of 90 seconds per hole or less. During the constant feed test (to simulate drill press drilling), the drill bits drilled an average of 3,074 holes before failure.

Example #2

Quarter inch (¼") drill bits in accordance with the disclosure were tested. The quarter inch (¼") diameter experimental drill bits manufactured from an M42 steel with an aluminum chromate coating were tested. In the constant bias test (to simulate hand held drilling), the drill bits had an average speed of cut of 18.88 seconds, and drilled an average of 30 holes testing 90 seconds or less per hole. In the constant feed test (to simulate drill press drilling), the drill bits drilled an average of 3,600 holes without failure.

Thus, the drill bits of the present disclosure provide superior results when tested with respect to the Best in Class drill bits for their particular cutting environment. The present disclosure provided drill bits which exceed the performance of all the Best in Class features of the Best in Class drill bits in both hand held drilling and in drill press drilling.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A drill bit comprising:
a shanking end;
a working end;
a helical flute portion between said shanking end and said working end, said helical flute portion having a web tapered from said working end to said shanking end such that a web thickness at said working end is from 10% to 35% of the drill bit diameter and a web thickness at a junction of said shanking end is from 70% to 90% of the diameter with a web taper rate of at least 0.080 and a ratio between the web thickness at the working end and the web thickness at the junction of the shanking end is between about 1:2 and 1:5; and
said helical flute portion having a helix length of $$L = \left(\frac{D \times \pi}{\tan \alpha}\right),$$

L is the helix length, D is the bit diameter, and α is the helix angle, wherein a ratio between the helix length L and the bit diameter D is between about 1:4 to 1:5 and the helix angle α is about 34° and 36°, wherein the drill bit is composed of a high speed steel material having at least 5% cobalt.

2. The drill bit according to claim 1, wherein said drill bit is capable of drilling at least approximately 2,300 bores in a piece of 4140 steel using a drill press operating with a spindle speed of approximately 750 rpm and a feed rate of approximately 0.006 inch per revolution, such that each bore has a depth of at least approximately 18 mm.

3. The drill bit according to claim 2, wherein said drill bit is capable of drilling at least approximately 15 holes through an approximately 6 mm thick piece of 304 stainless steel using a hand-held drill operated at approximately 1200 rpm with a constant bias of approximately 31 kg, such that each of the at least approximately 15 holes is drilled in less than approximately 90 seconds per hole.

4. The drill bit according to claim 3, wherein said drill bit is capable of drilling at least the first five holes of the at least approximately 15 holes in less than approximately 18 seconds per hole.

5. The drill bit according to claim 1, wherein said drill bit is capable of drilling at least approximately 15 holes through an approximately 6 mm thick piece of 304 stainless steel, using a hand-held drill operated at approximately 1200 rpm with a constant bias of approximately 31 kg, such that each of the at least approximately 15 holes is drilled in less than approximately 90 seconds per hole.

6. The drill bit according to claim 5, wherein said drill bit is capable of drilling at least the first five of the at least approximately 15 holes at a rate of 18 seconds or less per hole.

7. The drill bit according to claim 1, further comprising a coating layer of AlCr, TiAlN or combinations thereof.

8. The drill bit according to claim 1, wherein the high speed steel comprises at least one of M42 steel and WKE42 steel.

9. The drill bit according to claim 1, wherein said working end being a split point having a chisel edge length of approximately 0.011 mm to approximately 0.32 mm.

10. The drill bit according to claim 1, wherein said drill bit has been hardened between 1160° to 1190° C.

11. The drill bit according to claim 1, wherein the helical flute portion has a pair of margins having a width about 8% to 12% of the bit diameter.

* * * * *